April 23, 1940.  R. P. KOEHRING  2,198,253
METHOD OF MAKING COMPOSITE METAL BEARING ELEMENTS
Filed June 15, 1936
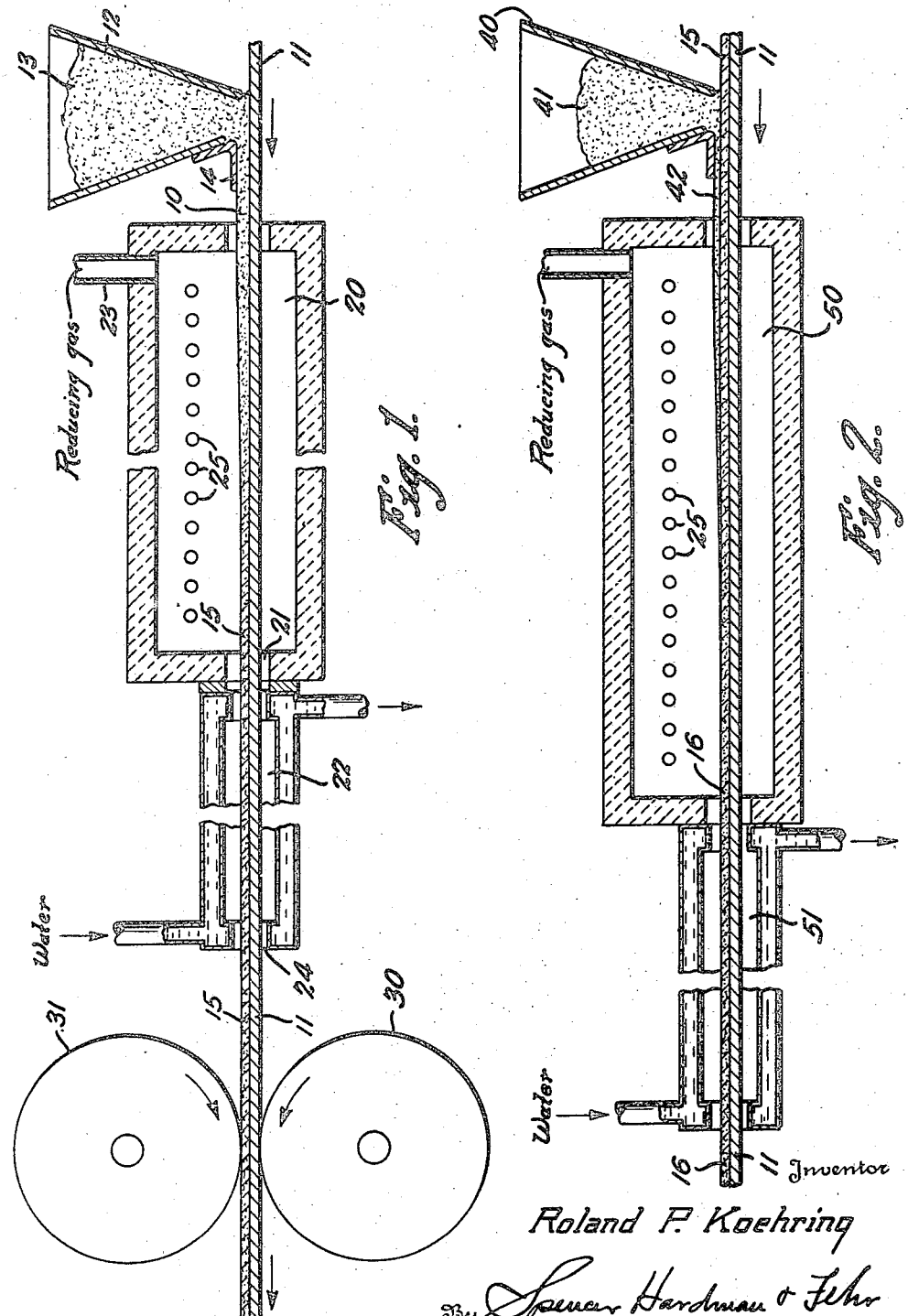
Inventor
Roland P. Koehring
By Spencer Hardman & Fehr
his Attorneys Patented Apr. 23, 1940

2,198,253

UNITED STATES PATENT OFFICE 2,198,253

METHOD OF MAKING COMPOSITE METAL BEARING ELEMENTS

Roland P. Koehring, Dayton, Ohio, assignor to General Motors Corporation, Detroit, Mich., a corporation of Delaware Application June 15, 1936, Serial No. 85,297

10 Claims. (Cl. 29—149.5)

This invention relates to a method of making a composite metal part having a relatively strong metal back strongly bonded to a lining having long-wear characteristics when used in rubbing contact upon a cooperating surface. This method may be used in making anti-friction bearings or the like, or in making high-friction elements such as clutch disks or brake shoes or the like.

Hence a general object of this invention is to provide an improved method of making a composite metal part having a reinforcing metal back strongly bonded to a lining made of different material and having long-wear characteristics when used as a rubbing element. The desired characteristics of the lining are obtained by choosing the composition thereof. For instance, if an anti-friction bearing element is desired certain ingredients are used to make the lining; if a high-friction element is desired certain other ingredients or proportions are used to make the lining.

A more specific object of this invention is to provide a method of making a highly porous metal lining bonded to a metal back by sintering uncompacted metal powder laid loosely upon the metal back. A feature of this method is the non-briquetting of the metal powder prior to sintering same together and simultaneously bonding same to the metal back. When the metal powder which is to be sintered together to form the porous lining is merely laid loosely upon the metal back in non-compacted condition, the porous metal lining obtained after sintering can be easily given a much higher degree of porosity than is obtained when such metal powders are first briquetted or compacted by rolling or other known and used pressure methods. In copending application Serial No. 81,432, filed May 23, 1936, and assigned to the same assignee as this present application, the metal powder to form the lining is first highly compacted upon the metal back prior to sintering. This initial compacting of the metal powder is an additional step and uniformly results in greater density in the sintered porous metal lining than is the case with the method of this present application.

The invention also has to do with the new product produced by the new method, consisting of a strong, porous metal matrix bonded to a solid back and impregnated with suitable soft bearing metal in the case of a bearing or with suitable frictional material in the case of a brake lining, clutch facing or the like. This construction is especially advantageous in the case of a bearing, for the hard sponge is of sufficient strength to take the load and at the same time serves as an effective means to carry off the heat in service owing to the intimate bond between it and the back, while the soft metal with which the sponge is filled has good frictional properties and eventually provides a thin film of soft metal over the entire bearing surface.

Another object of this invention is to provide a porous matrix lining of a single metal such as copper, molecularly bonded to a reinforcing metal back and thereafter impregnating the porous matrix lining with molten lead to form an anti-friction bearing element, or thereafter impregnating the porous matrix lining with a higher friction material such as molten litharge (PbO) to provide a high-friction bearing element.

Further objects and advantages of the present invention will be apparent from the following description, reference being had to the accompanying drawing wherein a preferred embodiment of the present invention is clearly shown.

In the drawing:

Fig. 1 is a diagrammatic view illustrating the method of applying a loose uncompacted layer of metal powder upon a relatively strong metal back and sintering this loose layer in situ upon the metal back to form a highly porous metal lining strongly bonded to the back, according to this invention.

Fig. 2 is a diagrammatic view illustrating a further step according to this invention, namely, the impregnating of a porous metal lining made according to the method illustrated in Fig. 1 with a molten material such as molten lead or molten litharge.

Referring to Fig. 1, a loose layer 10 of desired thickness of finely divided metal powder is applied onto a relatively strong metal strip 11, such as steel, as the strip 11 moves along under the hopper 12 at a slow uniform speed. The loose metal powder 13 in hopper 12 runs out by gravity upon strip 11 and is smoothed out by a suitable adjustable smoothing device 14 to provide a smooth uniform layer 10 of loose metal powder.

The moving metal strip 11 with the loose layer 10 thereon passes into the sintering chamber 20 and is there heated in a reducing atmosphere to such a temperature and for such a time period as will cause the loose metal particles to partially fuse or alloy together or to molecularly bond together and form a strong highly porous lining 15 and at the same time to molecularly bond to the metal strip 11. During this sintering process the thickness of the loose powder layer 10 is materially reduced so that the porous metal lining 15 emerging at 21 from the sintering chamber 20 is about one-third less than the loose powder layer 10 which enters chamber 20. Hence the original thickness of the powder layer 10 is made such as will give the desired thickness of the sintered porous metal lining 15. This can be readily determined by trial for any given ingredients in the metal powder 13. If strip 11 is of steel it is preferably but not necessarily first copper plated before the loose powder layer 10 is applied thereon since it has been found that the sintered porous lining 15 will bond somewhat more strongly to a copper surface than it will to a steel surface. However lining 15 will bond successfully to an uncoated clean steel surface.

The highly porous metal lining 15 passes from the hot sintering chamber 20 into the water-jacketed cooling chamber 22 where it is cooled in a dried reducing atmosphere to prevent rapid oxidation of the porous metal when exposed to room atmosphere when still very hot. Reducing gas is constantly supplied to chamber 20 thru duct 23 and so prevents entrance of room atmosphere therein. Reducing gas passes from chamber 20 into the cooling chamber 22 and thence out thru exit opening 24. A suitable reducing gas for this method may be made by incompletely burning natural gas with air (preferably about 5½ parts air to 1 part of natural gas) and then removing the water vapor of combustion by condensing the water vapor by refrigeration until there remains only about three-tenths of a pound of water vapor in 1000 cubic foot of the reducing gas. The dried reducing gas is then passed into sintering chamber 20 thru duct 23 where it is reheated to the accurately controlled desired sintering temperature by the electric heater elements 25, or other suitable heating devices.

The density or porosity of the porous lining 15 may be accurately controlled if desired by a subsequent sizing or pressure operation, such for instance as passing the strip 11 with the porous lining 15 bonded thereto between pressure rolls 30, 31, as illustrated at the left side of Fig. 1. This sizing operation may be followed by a second heat treatment in a reducing atmosphere if it is deemed advisable to anneal the porous lining after such substantially cold working thereof. Or if desired, porous lining 15 may be subjected to a similar hot-rolling step by passing the strip between similar pressure rolls mounted within a heated chamber before the strip is cooled in the cooling chamber 22. Of course both sides of the back strip 11 may have a porous metal lining bonded thereto simply by first applying the porous lining on one side thereof and then repeating the above method for applying a porous lining on the other side.

The following finely powdered materials 13 have been strongly bonded to a copper-plated steel strip 11 by the above described method:

(1) Powder mixture containing 90 parts Cu, 10 parts Sn.

(2) Powder mixture containing 90 parts Cu, 10 parts Sn, 4 parts graphite.

(3) Powder mixture containing 90 parts Cu, 10 parts Sn, 4 parts graphite, 6 parts $MgCO_3$.

(4) Powder mixture containing 90 parts Cu, 10 parts Sn, 25 parts Pb.

(5) Powder mixture containing 90 parts Cu, 10 parts Sn, 6 parts $MgCO_3$.

(6) Powder mixture containing 32 parts Cu, 68 parts Ni.

(7) Powder mixture containing 95 parts Cu, 5 parts Ni.

(8) Pure copper powder.

(9) Pure copper powder containing 6% graphite.

The above formulas are given as illustrations and in no way limit the method of this invention to these particular ingredients and/or proportions. Other metal powders or powder mixtures may be used for any desired specific use of the resulting product. In above Formulas 1, 2, 3, 4, and 5 the copper and tin powders alloy together during sintering preferably at a temperature of about 1500° F. and form a porous bronze structure having 90% copper and 10% tin, an especially desirable bronze. Of course any other desired proportions of copper and tin may be used to form other bronzes which may be desired in given applications.

In above Formulas 3 and 5, finely divided magnesium carbonate ($MgCO_3$) is added to increase the coefficient of friction of the resulting friction element. During sintering the $MgCO_3$ apparently breaks down into magnesium oxide (MgO) and carbon dioxide which escapes as a gas. Such friction elements may be used in automobile clutches and brake shoes for road wheel brakes since they can properly withstand the high temperature to which they will often be subjected in such uses. The small graphite content in Formula 3 prevents galling and materially reduces the wearing away of the friction element and otherwise gives it desirable characteristics such as smooth engagement with its cooperating metal surface.

In above Formula 4, the lead content becomes fully molten during sintering in a reducing atmosphere but will not exude from the lining 15 and will be held within the interstices therein in uniformly dispersed films due to the molten lead wetting and adhering to the perfectly clean pore surfaces of the porous bronze formed by the alloying of the copper and tin powders. When the porous bronze structure is cooled in a reducing atmosphere this lead solidifies in its finely dispersed state and hence remains in the bronze structure in a finely dispersed and uniformly distributed form. This formula provides long-wearing anti-friction bearing elements.

Above Formulas 6 and 7 illustrate the large variation in proportions of different metal powders which may be sintered together by the method of this invention. Nickel and copper powders may be sintered together in a reducing atmosphere to form a highly porous structure, the sintering temperature being about 2025° F. Formula 6 gives an especially stainless porous alloy of copper and nickel.

Above Formulas 8 and 9 differ from the other formulas in that only one metal powder is used instead of two and hence during sintering there can be no alloying together of two metals having differing melting points such as occurs in well-known sintering processes. When only copper powder is used for the metal powder 13 (whether or not there is present any non-metal ingredient such as graphite) in the above described method it is sintered in a reducing atmosphere at about 1900° F. in chamber 20 and thus provides a highly porous copper lining 15 molecularly bonded to the steel strip 11. Copper melts at 1980° F. and hence if heated in chamber 20 at this temperature the copper powder will melt and flow together and thus the desired porous structure will be destroyed. I have found however that it is unnecessary to raise finely divided copper powder to its melting point in order to cause the loose copper particles to molecularly bond together, and that this may be done by the above method at a temperature as low as 1900° F. The loosely contacting copper particles seem to simply grow together by a grain growth when maintained at this temperature in a reducing atmosphere and thus provide a relatively strong highly porous structure of copper as the only metal constituent. The porous copper lining of Formula 8 will readily absorb and retain molten lead or molten lead oxide, as hereinafter described in more detail, to provide highly useful anti-friction or friction rubbing elements. The porous copper and graphite lining of Formula 9 will also absorb and retain molten lead by the method hereinafter described.

Fig. 2 illustrates a suitable method according to this invention for impregnating with a suitable molten material the porous metal lining 15 resulting from the method illustrated in Fig. 1.

The following is given as a specific example: After a porous copper lining 15 is bonded to a copper-plated steel strip 11 as above described, its porosity may be controlled to the precise degree desired by passing it between pressure rolls 30, 31 of Fig. 1, or by any other suitable pressing operation. The composite strip is then passed under the hopper 40 containing granulated or powdered lead 41, and a uniform layer 42 of granulated or powdered lead is applied directly upon the top of the porous copper lining 15 in a manner quite similar to that described above for applying the layer 10 of the metal powders to be sintered. The strip then passes into chamber 50 and is there heated in a dried reducing atmosphere to a temperature of about 1500° F. which of course melts the lead powder into a highly fluid condition but does not change the porous structure of the copper lining 15 since molten lead will not dissolve copper at 1500° F. The molten lead flows down into the minute pores in the porous copper and uniformly impregnates same by capillarity action, since under these conditions molten lead has an affinity for wetting and adhering to the clean copper surfaces of the pores which are kept entirely free of metal oxides by the reducing atmosphere in chamber 50. After the lead is fully impregnated into the porous copper, the strip passes on into the water-jacketed cooling chamber 51 and is there cooled in a reducing atmosphere to prevent oxidation of the metals such as would occur if the strip be exposed to air in a highly heated condition. The reducing gas used in chambers 50 and 51 of Fig. 2 is preferably the same as that described above in connection with the method shown in Fig. 1.

A sufficient amount of lead 42 is used to give the desired lead content in the porous copper matrix which remains molecularly bonded to the steel strip 11. Hence there results a copper-lead structure 16 having a strong copper matrix 15 molecularly bonded to the steel strip 11 and having lead very finely dispersed and uniformly distributed thruout the copper matrix. Preferably but not necessarily, sufficient lead is used to completely fill the pores of the copper matrix. Any other suitable means may be used for accurately controlling the weight of lead applied to the porous copper lining 15 in the method of Fig. 2, for instance, a strip of lead foil or sheet lead of desired thickness may be laid loosely upon the porous lining 15 as it enters chamber 50. Since the lead first melts in chamber 50 its original form is immaterial except for convenience in applying it substantially uniformly over the surface of the porous copper lining 15. Since a very highly porous copper lining 15 may be made by the method of Fig. 1 the percentage of lead content in the final copper-lead lining 16 may be as high as 50%, or even higher if desired for any reason. As stated above, the porosity of the copper lining 15 may be reduced to any desired degree by compacting same after sintering by high pressure rolls 30, 31 or by any other suitable compacting device, and thus the lead content in the final copper-lead lining 16 may be readily precisely controlled and made as small as desired for any given use.

The composite strip emerging from chamber 51 may be kept in long substantially straight lengths, or it may be coiled up in large coils, and transported to a machine for cutting it into blanks and forming bearings therefrom. Short lengths of this strip may be cut off and coiled up into full circular form to form split bearing bushings which have an outer relatively strong steel back and an inner anti-friction copper-lead lining molecularly bonded to the steel back. Or any other desired form of bearings may be made from the composite strip, for instance, half-round bearings for the crank shaft and connecting rods of automobile engines.

Instead of impregnating the porous copper lining 15 with molten lead as above described, it may be similarly impregnated with litharge (PbO) or with both litharge and lead in any suitable proportions to form a bearing element having a higher friction coefficient, which is desired in certain uses such as friction elements for brakes and clutches.

For instance, a steel clutch disk may have a porous copper lining molecularly bonded to both sides thereof by the first described method of this invention and thereafter the porous copper linings may be impregnated with litharge or with both lead and litharge by the second described or impregnating method of this invention to provide a unitary clutch disc for use in automobiles. Similarly brake linings or brake shoes for automobile wheel brakes may be made by molecularly bonding such a relatively high-friction lining directly to a reinforcing steel element.

In all bearing linings, whether friction or anti-friction, made by the above described method the proportion and fine uniform distribution of the impregnating material may be very accurately controlled because the form, density and porosity of the porous metal matrix is completely determined prior to the introduction of the impregnating material and the subsequent impregnation does not change the porous network structure of the porous metal matrix but only fills in the interstices therein. This feature permits a precise control over the relative weight of the impregnating material capable of being absorbed into the final lining material and also requires its uniform dispersion thruout the body of the final lining material.

While the embodiment of the present invention as herein disclosed, constitutes a preferred form or forms, it is to be understood that other forms might be adopted, all coming within the scope of the claims which follow.

What is claimed is as follows:

1. The steps in the method of providing a leaded porous copper lining on a metal back, comprising: applying a substantially loose layer of copper powder upon a non-porous metal back, then heating at a temperature below the melting point of copper and for a time sufficient to cause the loose copper particles to molecularly bond together and form a relatively highly porous copper lining having fine interconnecting voids therein and also to cause said lining to bond to said back, then applying lead to the surface of the porous copper lining at a temperature above the melting point of lead but below such temperature as will cause the molten lead to change the form of the copper network and thereby impregnating the porous copper lining with molten lead, then cooling the structure.

2. The steps in the method of providing an impregnated porous copper lining on a ferrous metal back, comprising: plating a non-porous ferrous back with a copper coating, applying a substantially loose layer of copper powder upon the copper plating on the back, then heating in a non-oxidizing atmosphere until the loose copper particles molecularly bond together and form a relatively highly porous copper lining and also molecularly bond strongly to said copper plating, and subsequently impregnating the porous copper lining with molten lead at such a temperature above the melting point of lead as will not destroy the porosity of the porous copper network, then cooling the structure.

3. The steps in the method of making a composite bearing blank having a highly porous metal lining upon a reinforcing metal back, comprising: providing a relatively strong non-porous metal back, spreading a substantially loose non-compacted layer of the lining metal in powder form upon a substantially flat surface of said non-porous metal back and thereby retaining the loose powder layer in position by gravity, then subjecting said loose powder layer in situ upon said back to a non-oxidizing atmosphere at a temperature and for a time period sufficient to cause the loose metal particles of said layer to sinter together and form a rigid highly porous metal lining and simultaneously to cause the porous lining to molecularly bond to said back.

4. The steps in the method of providing a highly porous metal lining upon a solid reinforcing metal back, comprising: spreading a loose layer of the lining metal in powder form upon a substantially flat surface of a continuous strip of non-porous metal and retaining said loose powder layer in position by gravity, then passing said strip horizontally thru a sintering chamber, the sintering conditions in said chamber being such as to cause the loose powder to sinter together and form a rigid highly porous lining and simultaneously to cause the porous lining to molecularly bond to said strip.

5. The method of making composite metal bearings which consists in providing a non-porous metal supporting strip, applying to the strip a loose layer of powdered metal capable of bonding to the strip, subjecting the prepared strip to heat treatment in a non-oxidizing atmosphere at temperatures sufficiently high to cause the metal particles to sinter together into a porous layer or sponge and at the same time sinter to the strip in good heat conducting relation but without substantially deforming the strip, impregnating the sponge with molten soft bearing metal at temperatures substantially below the said sintering temperature so as not to deform the strip or sponge, cooling the strip to solidify the soft bearing metal in the pores of the sponge, and shaping the resulting strip into circular bearing form.

6. The method of making composite metal bearings which consists in providing a sheet steel supporting strip, applying to the strip a loose layer of cupreous metal powder, subjecting the strip so prepared to heat treatment in a non-oxidizing atmosphere at temperatures sufficiently high to cause the metal particles to sinter together into a porous layer or sponge and at the same time sinter to the strip in good heat conducting relation but without deforming the strip, impregnating the sponge with molten soft bearing metal at temperatures substantially below the said sintering temperature so as not to deform the strip or sponge, and cooling the strip to solidify the soft bearing metal in the pores of the sponge.

7. In the method as defined in claim 6, said impregnation being carried out in a non-oxidizing atmosphere.

8. The steps in the method of providing a highly porous metal lining upon a solid reinforcing metal back, comprising: spreading a loose layer of the lining metal in powder form upon a substantially flat surface of a continuous strip of non-porous metal and retaining said loose powder layer in position by gravity, then passing said strip horizontally through a sintered chamber, the sintering conditions in said chamber being such as to cause the loose powder to sinter together and form a rigid highly porous lining and simultaneously to cause the porous lining to molecularly bond to said strip, and then subsequently impregnating said porous lining with a molten void-filling material having the desired frictional characteristics at temperatures substantially below the said sintering temperature 9. The steps in the method of making a composite bearing blank having a highly porous metal lining upon a reinforcing metal back, comprising: providing a relatively strong non-porous metal back, distributing a substantially loose non-compacted layer of lining metal in powder form upon a substantially flat surface of said non-porous back and thereby retaining the loose powder layer in position by gravity, then subjecting said loose powder layer in situ upon said back to a non-oxidizing atmosphere at a temperature and for a time sufficient to cause the loose metal particles of said layer to sinter together and form a rigid highly porous metal lining and simultaneously to cause the porous lining to molecularly bond to said back, and then subsequently impregnating said porous lining with a molten void-filling material having the desired frictional characteristics at temperatures substantially below said sintering temperature.

10. The method as disclosed in claim 9 wherein the void filling material consists of lead oxide.

ROLAND P. KOEHRING.